United States Patent
Walters

(10) Patent No.: US 8,926,277 B2
(45) Date of Patent: Jan. 6, 2015

(54) FAN CASING FOR A TURBOFAN ENGINE

(75) Inventor: Edward A. Walters, Derby (GB)

(73) Assignee: Rolls-Royce PLC, London (GB)

(*) Notice: Subject to any disclaimer, the term of this patent is extended or adjusted under 35 U.S.C. 154(b) by 511 days.

(21) Appl. No.: 13/365,851

(22) Filed: Feb. 3, 2012

(65) Prior Publication Data

US 2012/0263583 A1 Oct. 18, 2012

(30) Foreign Application Priority Data

Mar. 3, 2011 (GB) .................................. 1103583.9

(51) Int. Cl.
*F01D 25/24* (2006.01)
*F02K 3/06* (2006.01)

(52) U.S. Cl.
CPC ................ *F01D 25/243* (2013.01); *F02K 3/06* (2013.01); *F05D 2300/603* (2013.01); *F05D 2300/702* (2013.01)
USPC ........................................ 415/214.1; 415/220

(58) Field of Classification Search
CPC .............................. F01D 25/243; F04D 29/52
USPC .................... 415/213.1, 214.1, 220
See application file for complete search history.

(56) References Cited

U.S. PATENT DOCUMENTS

| 5,431,532 | A | * | 7/1995 | Humke et al. | 415/9 |
|---|---|---|---|---|---|
| 8,322,971 | B2 | * | 12/2012 | Coupe et al. | 415/9 |
| 8,454,298 | B2 | * | 6/2013 | Cardarella, Jr. | 415/9 |
| 8,613,593 | B2 | * | 12/2013 | Ottow et al. | 415/213.1 |
| 2008/0159859 | A1 | | 7/2008 | Lhoest | |
| 2012/0020782 | A1 | * | 1/2012 | Rice et al. | 415/214.1 |

FOREIGN PATENT DOCUMENTS

| EP | 1 426 559 A1 | 6/2004 |
|---|---|---|
| EP | 1 589 195 A1 | 10/2005 |
| EP | 1 936 125 A1 | 6/2008 |

OTHER PUBLICATIONS

British Search Report issued in Application No. 1103583.9; Dated Jun. 6, 2011.

* cited by examiner

*Primary Examiner* — Ninh H Nguyen
(74) *Attorney, Agent, or Firm* — Oliff PLC

(57) ABSTRACT

A fan casing for a turbofan engine including an annular casing component of composite material including a body portion having an outwardly directed stiffening flange at one end, the stiffening flange being connected to the body portion by a radially outwardly stepped region, the fan casing also including a metallic ring which is coaxial with the annular casing component, the metallic ring being situated at least partially within the stepped region and being secured to the annular casing component.

13 Claims, 2 Drawing Sheets

FAN CASING FOR A TURBOFAN ENGINE

This invention claims the benefit of UK Patent Application No. 1103583.9, filed on 3 Mar. 2011, which is hereby incorporated herein in its entirety.

FIELD OF THE INVENTION

This invention relates to a fan casing for a turbofan engine.

BACKGROUND TO THE INVENTION

A turbofan engine comprises an engine core about which is disposed a fan casing. Generally, the fan casing is coaxial with the engine core and is supported on the core by a main support structure extending between the fan casing and the core. In addition to the main structure, the rear of the fan casing may be secured to the engine by struts which extend between the engine core and the rear of the fan casing. The struts resist relative motion between the engine core and the rear of the fan casing. The arrangement of the struts, fan casing and fasteners securing the struts to the fan casing must be able to withstand extreme loads such as those generated during a fan-blade-off event (i.e. shedding of a fan blade), for example following a bird strike.

The fan casing may also be attached to other functional elements such as thrust reverser units.

In order to improve rigidity of the fan casing it is known to provide the fan casing with a stiffener flange which extends radially outwardly from the fan casing. The stiffener flange is aligned with the struts in a common radial plane so that the forces acting at the root of the flange are transmitted directly through the struts. Typically, the fan casing is provided with hollow dowels which extend through bores in the casing. The dowels resist transverse loading of the fan casing (i.e. rotational and axial loading of the casing). In addition, fasteners extend through the dowels and secure the casing to the struts in the radial direction. The fasteners resist radial loading of the fan casing. The fasteners and dowels are arranged on opposing sides of the stiffening flange. This ensures an even distribution of load about the stiffener flange. The bores in the casing have to be machined with precise diametral tolerance. With composites there has been found to be fibre relaxation which makes it very difficult to achieve the required diametral tolerance to receive the dowels. Composite fibres also reduce in strength significantly when exposed to high temperatures and are liable to deform and tear in the event of an engine fire local to the strut interface under engine loading.

STATEMENTS OF INVENTION

According to the present invention there is provided a fan casing for a turbofan engine comprising an annular casing component of composite material comprising a body portion having an outwardly directed stiffening flange at one end, the stiffening flange being connected to the body portion by a radially outwardly stepped region, the fan casing also comprising a metallic ring which is coaxial with the annular casing component, the metallic ring being situated at least partially within the stepped region and being secured to the annular casing component, and wherein the metallic ring is provided with a stiffening element, the stiffening element comprising a radially extending rib which is disposed within the stepped region.

The metallic ring may provide an attachment location for the aft struts and the TRU.

The body portion may have an inner diameter which is substantially equal to the inner diameter of the metallic ring.

The stepped region may comprise a joggle having a first portion which extends radially outwardly from the main body of the body portion, and a second portion which extends axially from the radially outer edge of the first portion, the stiffening flange extending outwardly from the end of the second portion situated away from the first portion.

The metallic ring may be fastened to the first portion of the joggle.

The metallic ring may project axially outwardly from the stepped region.

The metallic ring may be provided with fastening features disposed axially to both sides of the stiffening flange. The second portion of the joggle may be apertured to provide access to the fastening features disposed to the side of the stiffening flange within the stepped region. The fan casing may be secured to at least one inwardly extending strut by way of fasteners which cooperate with the fastening features.

The fastening features may comprise bores.

The stiffening element may be substantially radially aligned with the stiffening flange.

The composite material may be a carbon fibre reinforced composite.

According to a second aspect of the invention there is provided a turbofan engine comprising an engine core, and a fan casing in accordance with the first aspect of the invention, wherein the fan casing is disposed coaxially with the engine core and is supported on the engine core by a plurality of struts extending between the core and the metallic ring. The struts may be connected to the metallic ring by fasteners extending through hollow dowels received in the bores.

BRIEF DESCRIPTION OF THE DRAWINGS

For a better understanding of the present invention, and to show more clearly how it may be carried into effect, reference will now be made, by way of example, to the accompanying drawings, in which:—

DETAILED DESCRIPTION

Figure 1:
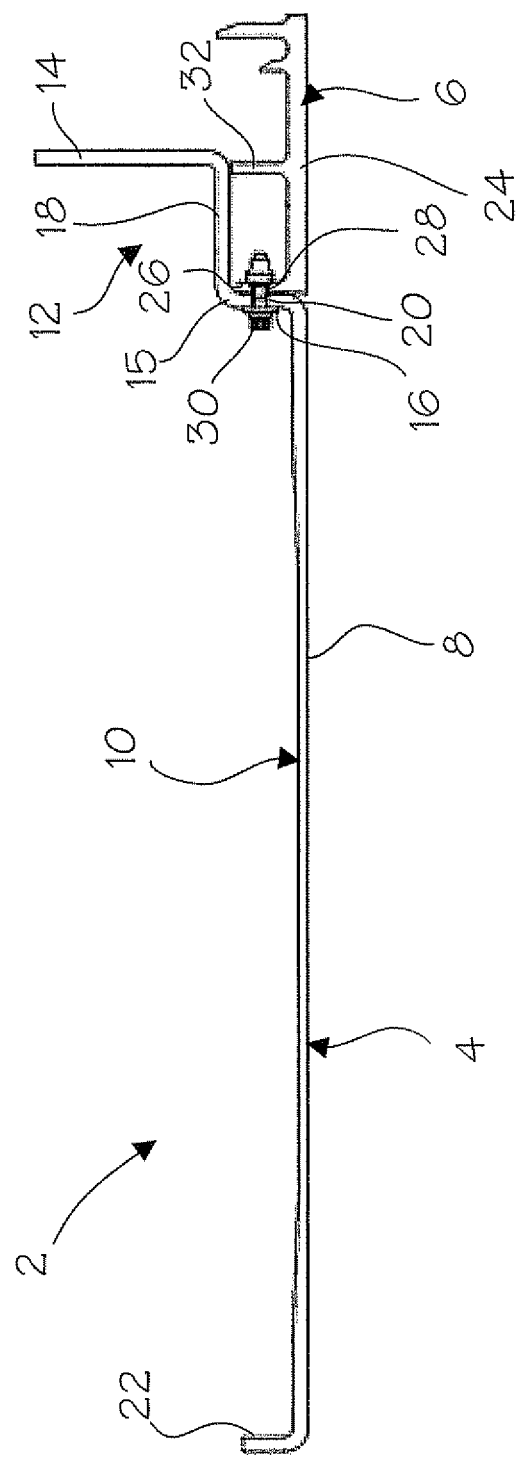
FIG. 1 is a partial sectional view of a fan casing.

FIG. 1 shows a fan casing 2 comprising an annular component 4 of composite material and a metallic ring 6. The fan casing 2 is shown in elevational section, with only the upper portion of the fan casing 2 visible. The annular component 4 and the metallic ring 6 are coaxial, the inner diameter of the annular component 4 being substantially equal to the inner diameter of the metallic ring 6.

The annular component 4 comprises a body portion 8 having a main body region 10 and a stepped region 12. A stiffening flange 14 extends radially outwardly from the circumferential edge of the stepped region 12. The stiffening flange 14 extends about the entire circumferential edge of the stepped region 12 and is formed integrally with the annular component 4. The annular component 4 is a monolithic structure comprising a composite material such as a carbon fibre reinforced composite.

The stepped region 12 comprises a joggle 15. The joggle 15 has a first portion 16 which extends radially outwardly from the main body region 10, and a second portion 18 which extends from the radially outer edge of the first portion 16 to the stiffening flange 14. The second portion 18 extends substantially coaxially with the main body region 10. Circumferentially spaced openings 20 are provided in the first portion 16. It will be appreciated that the radially extending first portion 16 will add stiffness to the annular component 4 which adds to the stiffness provided by the stiffening flange 14. A reduced stiffness stiffening flange 14 can therefore be used, for example a stiffening flange 14 of reduced thickness.

A second flange 22 extends radially outwardly from the circumferential edge of the main body region 10 opposite the joggle 15. Circumferentially spaced openings (not shown) are provided in flange 22 to allow attachment to a forward casing portion. The main body region 10 may be thickened from its centre towards the stepped region 12 and the second flange 22 to provide additional strength and stiffness.

The metallic ring 6 comprises a body portion 24 having a flange 26 which extends radially outwardly from a circumferential edge of the body portion 24. The metallic ring 6 is arranged so that a portion of the metallic ring 6 is within the stepped region 12, and the remainder projects axially (to the right, as seen in the Figures) from the annular component 4, i.e. beyond the stiffening flange 14. The flange 26 abuts the first portion 16 of the joggle 15. The diameter of the outer edge of the flange 26 is less than the inner diameter of the second portion 18 of the joggle 15. The metallic ring 6 thus fits within the stepped region 12 with the radially inner surface of the metallic ring 6 aligned in the same circumferential plane as the radially inner surface of the main body region 10. The flange 26 is provided with circumferentially spaced openings 28 which correspond to the openings 20 in the first portion 16 of the joggle 15. Fasteners 30, such as nut and bolt arrangements extend through the openings 20, 28 in the first portion 16 of the joggle 15 and the flange 26 to secure the metallic ring 6 to the annular component 4.

The metallic ring 6 has a stiffening element 32 comprising a radially outwardly extending flange. The stiffening element 32 extends circumferentially about the metallic ring 6. The stiffening element 32 may be aligned with the stiffening flange 14 with respect to the longitudinal axis of the fan casing 2 and so complements the stiffening action of the stiffening flange 14. The stiffening element 32 may comprise a plain radially extending web as shown in FIG. 1, but in other embodiments the stiffening element 32 may have a peripheral flange at its radially outer end, so as to have, for example, an L-shaped or T-shaped cross-section. The stiffening element 32 extends about the entire circumferential extent of the metallic ring 6.

Figure 2:
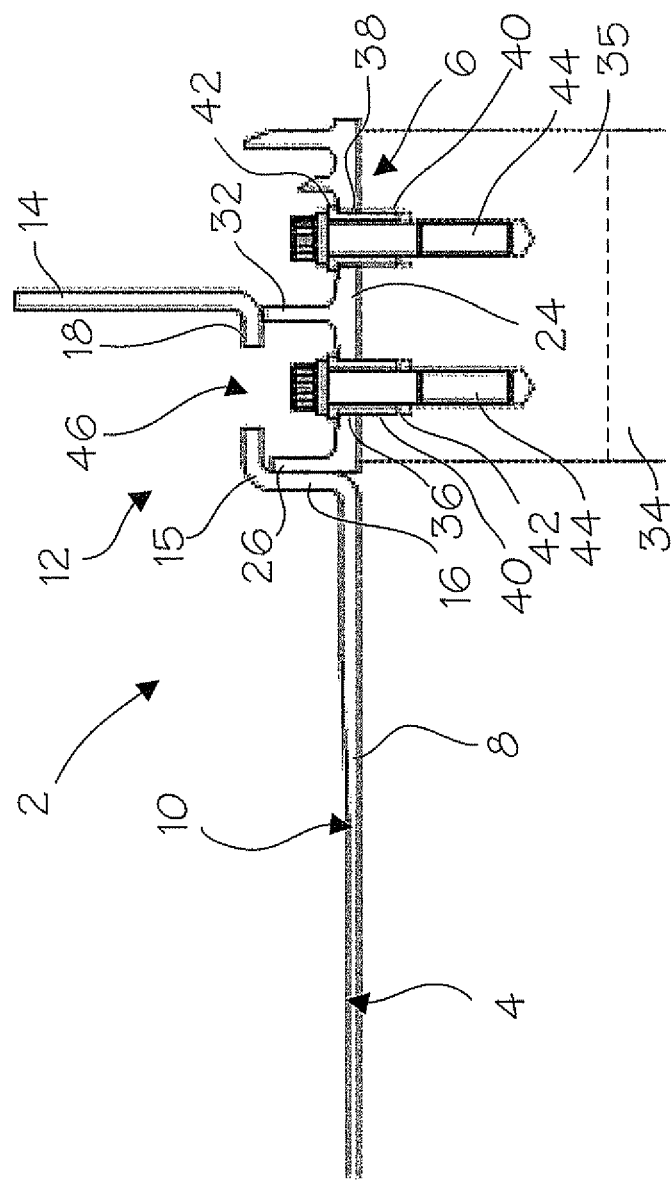
FIG. 2 is a partial section view of a fan casing connected to a strut.

FIG. 2 shows a second cross-section of the fan casing 2 through the region in which the metallic ring 6 is secured to one of a plurality of struts 34 which extend between the metallic ring 6 and an engine core (not shown) of a turbofan engine. The struts 34 support the fan casing 2 on the engine core and may comprise a pair of struts 34 disposed on opposite sides of the engine core. Each strut comprises two limbs which converge in the radially outward direction and meet at a connecting point 35 which lies against the body portion 24 of the ring 6.

The metallic ring 6 comprises fastening features in the form of first bores 36 and second bores 38 which extend radially through the metallic ring 6. The bores 36, 38 are disposed on opposite sides of the stiffening element 32 such that the first bores 36 are disposed within the stepped region 12, and the second bores 38 are disposed outside the stepped region 12. The first and second bores 36, 38 are disposed axially to both sides of the stiffening flange 14 and the stiffening element 32. Radially extending bores 40 are provided in the ends of the struts 34. These bores 40 align with the bores 36, 38 in the metallic ring 6. Hollow dowels 42 extend through the bores 36, 38 in the metallic ring 6 and into the bores 40 in the ends of the struts 34. The hollow dowels 42 are a snug fit within the bores 36, 38, 40 so as to prevent axial or circumferential displacement of the metallic ring 6, and hence the fan casing 2, with respect to the struts 34. Fasteners 44 extend through the hollow dowels 42 and engage with threaded portions of the bores 40 in the ends of the struts 34. The fasteners 44 prevent radial displacement of the metallic ring 6, and hence the fan casing 2, with respect to the struts 34. In an alternative embodiment, for example if the struts 34, or at least the connecting portion 35, are made from a composite material, threaded inserts may be fitted within the bores 40 to engage the fasteners 44.

The second portion 18 of the joggle 15 has access apertures 46 which are aligned with the fasteners 44. The access apertures 46 provide access to the fasteners 44 and enable the fasteners 44 disposed within the stepped region 12 to be inserted and removed though the body portion 8.

By securing the fan casing 2 to the struts 34 via the metallic ring 6, retention of the fan casing 2 is by fasteners acting directly through the metallic ring 6 and the struts 34. Concentrated loads acting at the struts 34 are therefore exerted through the metallic ring 6 rather than the composite annular component 4. These loads are transferred to the annular component 4 by the fasteners 30, which enable the loads to be spread around the circumference of the annular component 4. Tearing of the fan casing 2 at the struts 34 during a fan-blade-off event or following an engine fire is therefore less likely to occur.

The stepped portion 12 enables the stiffening flange 14 to be positioned between axially spaced apart fasteners 44 thus ensuring that the loads acting through the stiffening flange 14, act equally on the fasteners 44.

In a variant of the embodiment described above, the stiffening element 32 extends only over the portions of the metallic ring 6 which are adjacent the struts 34.

The present invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within their scope.

What is claimed is:

1. A fan casing for a turbofan engine, the fan casing comprising:
    an annular casing component of composite material comprising a body portion having an outwardly directed stiffening flange at one end, the stiffening flange being connected to the body portion by a radially outwardly stepped region, and
    a metallic ring which is coaxial with the annular casing component, the metallic ring being situated at least partially within the stepped region and being secured to the annular casing component, wherein
        the metallic ring is provided with a stiffening element, the stiffening element comprising a radially extending rib which is disposed within the stepped region.

2. A fan casing as claimed in claim 1, wherein the body portion has an inner diameter which is substantially equal to the inner diameter of the metallic ring.

3. A fan casing as claimed in claim 2, wherein the stepped region comprises a joggle, the joggle comprising:
    a first portion which extends radially outwardly from a main body of the body portion, and
    a second portion which extends axially from a radially outer edge of the first portion, wherein the stiffening flange extends outwardly from the end of the second portion situated away from the first portion.

4. A fan casing as claimed in claim 3, wherein the metallic ring is fastened to the first portion of the joggle.

5. A fan casing as claimed in claim 3, wherein the metallic ring projects axially outwardly from the stepped region.

6. A fan casing as claimed in claim 5, wherein the metallic ring is provided with fastening features disposed axially to both sides of the stiffening flange.

7. A fan casing as claimed in claim 6, wherein the second portion of the joggle is apertured to provide access to the fastening features disposed to the side of the stiffening flange within the stepped region.

8. A fan casing as claimed in claim 6, which is secured to at least one inwardly extending strut by way of fasteners which cooperate with the fastening features.

9. A fan casing as claimed in claim 6, wherein the fastening features comprise bores.

10. A turbofan engine comprising:
an engine core, and
a fan casing as claimed in claim 9, wherein the fan casing is disposed coaxially with the engine core and is supported on the engine core by a plurality of struts extending between the core and the metallic ring.

11. A turbofan engine as claimed in claim 10, wherein the struts are connected to the metallic ring by fasteners extending through hollow dowels received in the bores.

12. A fan casing as claimed in claim 1, wherein the stiffening element is substantially radially aligned with the stiffening flange.

13. A fan casing as claimed in claim 1, wherein the composite material is a carbon fibre reinforced composite.

* * * * *